(12) United States Patent
Mankame et al.

(10) Patent No.: US 10,791,839 B2
(45) Date of Patent: Oct. 6, 2020

(54) WAFFLE-BOARD PATTERNED B-SURFACE FOR SEAT CUSHIONS

(71) Applicant: GM Global Technology Operations LLC, Detroit, MI (US)

(72) Inventors: Nilesh D. Mankame, Ann Arbor, MI (US); Onkar S. Akolkar, Warren, MI (US); Daniel W. Booth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 16/107,346

(22) Filed: Aug. 21, 2018

(65) Prior Publication Data

US 2020/0060424 A1 Feb. 27, 2020

(51) Int. Cl.
| | |
|---|---|
| *A47C 7/02* | (2006.01) |
| *A47C 7/14* | (2006.01) |
| *B60N 2/70* | (2006.01) |
| *A47C 7/18* | (2006.01) |

(52) U.S. Cl.
CPC .................. *A47C 7/14* (2013.01); *A47C 7/18* (2013.01); *B60N 2/7035* (2013.01); *B60N 2205/00* (2013.01)

(58) Field of Classification Search
CPC .. A47C 7/18; A47C 7/029; A42B 3/12; A42B 3/125; B62J 1/20
USPC ............ 297/452.46, 452.47, 452.48, 219.11, 297/219.1; 5/420, 421
See application file for complete search history.

(56) References Cited

U.S. PATENT DOCUMENTS

| | | | | |
|---|---|---|---|---|
| 3,818,522 A * | 6/1974 | Schuster | ............... | A47C 21/046 5/652.1 |
| 5,429,852 A * | 7/1995 | Quinn | ....................... | A47C 7/18 297/452.26 |
| 7,533,941 B2 * | 5/2009 | Saitou | .................. | B60N 2/5621 297/452.27 |
| 7,695,069 B2 * | 4/2010 | Prust | ........................ | A47C 7/74 297/452.45 |
| 8,062,456 B2 * | 11/2011 | Kuo | ........................ | B29C 70/46 156/247 |
| 8,087,726 B2 * | 1/2012 | Chen | ....................... | A47C 7/402 297/230.1 |
| 9,095,221 B1 * | 8/2015 | Tiffany | .................. | A47C 17/04 |
| 10,588,372 B2 * | 3/2020 | Ho | .......................... | A42B 3/121 |
| 2003/0037377 A1 * | 2/2003 | Kawamura | .......... | A47C 21/046 5/652 |
| 2004/0090093 A1 * | 5/2004 | Kamiya | ............... | B60N 2/5628 297/180.14 |
| 2005/0104423 A1 * | 5/2005 | Yu | .............................. | B62J 1/00 297/214 |
| 2007/0241604 A1 * | 10/2007 | Saitou | .................. | B60N 2/5621 297/452.26 |

(Continued)

*Primary Examiner* — Chi Q Nguyen
(74) *Attorney, Agent, or Firm* — Quinn IP Law

(57) ABSTRACT

A seat cushion includes a cushion body defining a first body surface and a second body surface opposite the first body surface, wherein the first body surface is configured to face the seat occupant, and the second body surface is configured to face away from the seat occupant. The cushion body defines a plurality of holes extending into the second body surface or columns extending from the second body surface. The holes or columns are arranged on a pattern to allow the cushion body to passively conform to the seat occupant, thereby enhancing comfort.

9 Claims, 14 Drawing Sheets

(56) References Cited

U.S. PATENT DOCUMENTS

| | | | |
|---|---|---|---|
| 2009/0217457 A1* | 9/2009 | Graebe | A47C 7/021 5/653 |
| 2010/0194171 A1* | 8/2010 | Hirata | B60N 2/01508 297/452.48 |
| 2011/0094037 A1* | 4/2011 | Chen | A47C 7/14 5/655.5 |
| 2013/0167302 A1* | 7/2013 | Pearce | A47C 27/144 5/739 |
| 2015/0329027 A1* | 11/2015 | Axakov | B60N 2/565 297/180.13 |
| 2016/0007671 A1* | 1/2016 | Prust | A47C 27/144 2/411 |

* cited by examiner

WAFFLE-BOARD PATTERNED B-SURFACE FOR SEAT CUSHIONS

INTRODUCTION

The present disclosure generally relates to seat cushions and, more specifically, to the waffle-board patterned B-surface for cushions.

Vehicle operators and passengers typically sit on seats. In some instances, the vehicle passengers and operators sit on the seats for an extended period of time. For this reason, it is desirable to enhance the seat comfort.

SUMMARY

When an occupant sits on a traditional foam cushion or a slab of foam, the foam deforms to distribute the occupant's load and thus increases the area supporting the occupant. This is why sitting on a cushion is more comfortable than sitting on a hard bench. However, the contours resulting from occupants sitting on the cushions with the special B-surface patterns (as described below) yield better static comfort (i.e., lower max. cpress values). This is because these patterns lead to a significantly higher increase in the area supporting the occupants than for a flat foam with the same thickness. In this disclosure, each occupant generates a custom contour on a cushion when she/he sits on them. This goes away when the occupant gets off of the cushion and the cushion has recovered to its original configuration. The contour 'generation' process repeats every time an occupant sits on the cushion. To address these issues, the present disclosure describes a prescribed B-surface pattern to improve comfort without increasing cushion thickness, mass or manufacturing complexity.

In some embodiments, the seat cushion includes a cushion body defining a first body surface and a second body surface opposite the first body surface, wherein the first body surface is configured to face the seat occupant, and the second body surface is configured to face away from the seat occupant. The cushion body defines a plurality of holes extending into the second body surface, wherein the plurality of holes is arranged on a pattern to allow the cushion body to passively conform to the seat occupant, thereby enhancing comfort. The cushion body defines a maximum thickness from the first body surface to the second body surface, and each of the plurality of holes has a depth, the depth is fifteen percent of the maximum thickness to enhance seating comfort of the seat cushion. The cushion body defines a maximum thickness from the first body surface to the second body surface, and each of the plurality of holes has a depth, the depth is twenty-five percent of the maximum thickness to enhance seating comfort of the seat cushion. The cushion body includes a front region, and the front region of the cushion body is tapered to control pressure distribution under knees of the seat occupant. The cushion body includes a rear region, and the rear region includes a fillet to control pressure distribution under a coccyx of the seat occupant.

Each of the plurality of holes may have a square shape, a circular shape, an elliptical shape, a hexagonal shape, a triangular shape, and/or a combination thereof. The holes may have different hole sizes in different regions of the cushion body. The holes may have different hole orientations in different regions of the cushion body. The holes may have different hole depths in different regions of the cushion body. Some regions of the cushion body do not have holes.

The cushion body includes a first material. At least one of the plurality of holes is filled with a second material. The first material has a first elastic modulus. The second material has a second elastic modulus. The second elastic modulus is less than the first elastic modulus to enhance seating comfort of the seat cushion. The holes are partially filled with the second material. At least one of the holes is completely filled with the second material. The cushion body includes a plurality of stacked layers. Each of the stacked layers has the plurality of holes. Each of the plurality of stacked layers has a first layer surface and a second layer surface opposite the first layer surface. The first layer surface is configured to face the vehicle occupant seated on the seat cushion, the second layer surface is configured to face away from the vehicle occupant seated on the seat cushion, and at least one of the plurality of holes extends into the second layer surface. At least one of the holes is entirely disposed between the first body surface and the second body surface.

In some embodiments, the seat cushion includes a cushion body defining a first body surface and a second body surface opposite the first body surface. The first body surface is configured to face seat occupant, and the second body surface is configured to face away from the seat occupant. The cushion body defines a plurality of columns extending from the second body surface, wherein the plurality of columns is arranged on a pattern to allow the cushion body to passively conform to the seat occupant, thereby enhancing comfort. The cushion body directly interconnects the plurality of columns. The cushion body includes a cushion cover directly interconnecting the plurality of columns, and the cushion cover defines the first cushion surface. The cushion body includes side restraints coupled to at least two of the plurality of columns to minimize shear compliance.

Each of the columns may be configured as a stubby flute. Each of the plurality of holes has a square shape, a circular shape, an elliptical shape, a hexagonal shape, a triangular shape, or a combination thereof. Each of the columns may be tapered to provide progressive stiffness. Each of the columns includes a first column layer and a second column layer directly connected to the first column layer, the first column layer is tapered, and the second column layer has a uniform cross-sectional dimension. The seat cushion further includes a cushion cover and a stretched trim coupled to the cushion cover. The cushion body includes movable restraints coupled to at least two of the plurality of columns to minimize shear, and the movable restraints are movable relative to the plurality of columns to tune a stiffness of the seat cushion.

The seat cushion may further include a plurality of angled struts. Each of the angled struts is obliquely angled relative to each of the plurality of columns. The columns include a first lateralmost column, a second lateralmost column, and a center column. Each of the first lateralmost column, the second lateralmost column, and the center column includes a first material, and a remaining of the plurality of columns includes a second material. The first material has a first elastic modulus. The second material has a second elastic modulus. The second elastic modulus is less than the first elastic modulus. The seat cushion further includes a plurality of angled struts. Each of the angled struts is obliquely angled relative to each of the plurality of columns. At least two of the angled struts are stiffer than a remaining of the plurality of angled struts. At least one of the columns is less stiff than a remaining of the plurality columns. The seat cushion further includes an outboard symmetry guide and inboard symmetry guide.

The above features and advantages and other features and advantages of the present teachings are readily apparent

DETAILED DESCRIPTION

Figure 1:
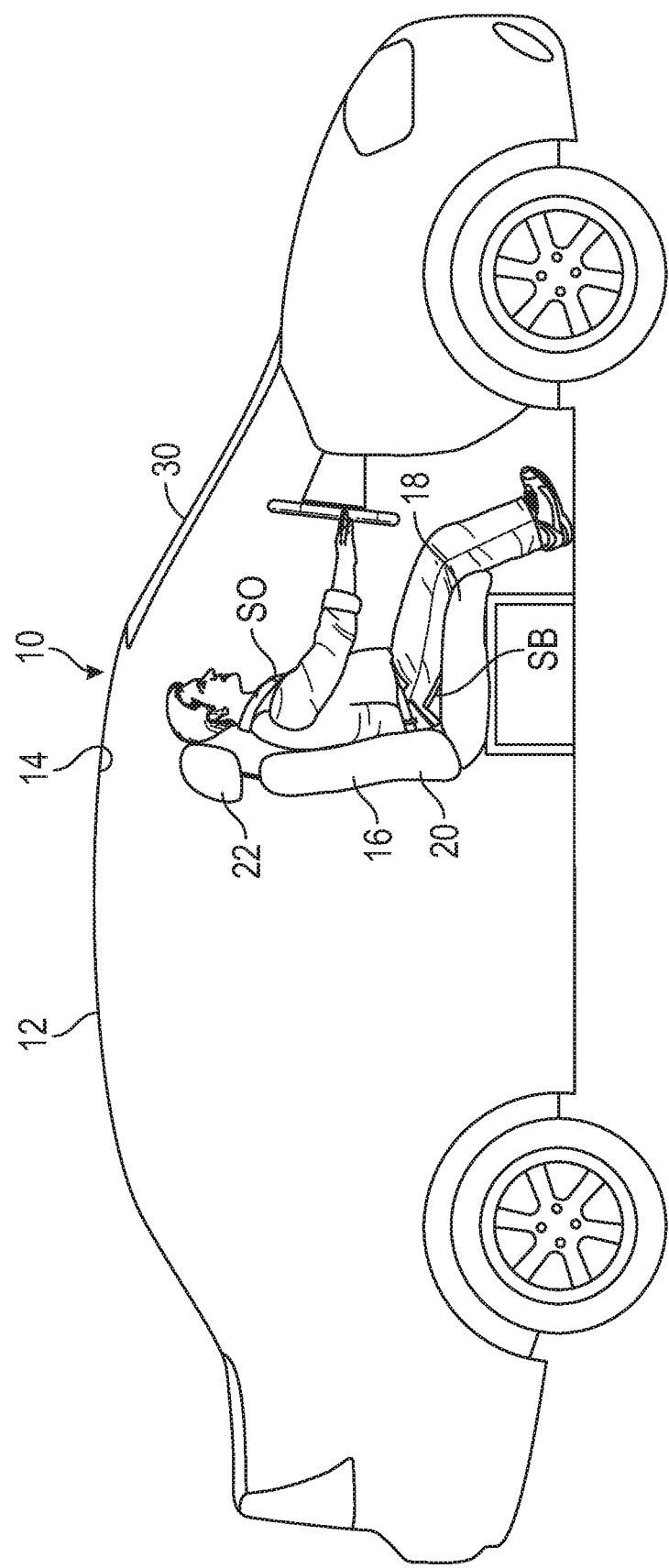
FIG. 1 is a schematic illustration of a vehicle including a vehicle seat.

Referring to the drawings, wherein like reference numbers correspond to like or similar components throughout the several figures, and beginning with FIG. 1, a vehicle 10 includes a vehicle body 12 defining a passenger compartment 14. The vehicle 10 further includes one or more vehicle seats 16 inside the passenger compartment 14. A seat occupant SO sits on the vehicle seat 16. Each vehicle seat 16 includes a seat cushion 18, a seat back 20 coupled to the seat cushion 18, and a headrest 22 coupled to the seat back 20. The seat back 20 is configured to support a vehicle occupant's back, and the headrest 22 is configured to support a vehicle occupant's head. The seat cushion 18 is configured to support the vehicle occupant's coccyx and legs.

Figure 2:
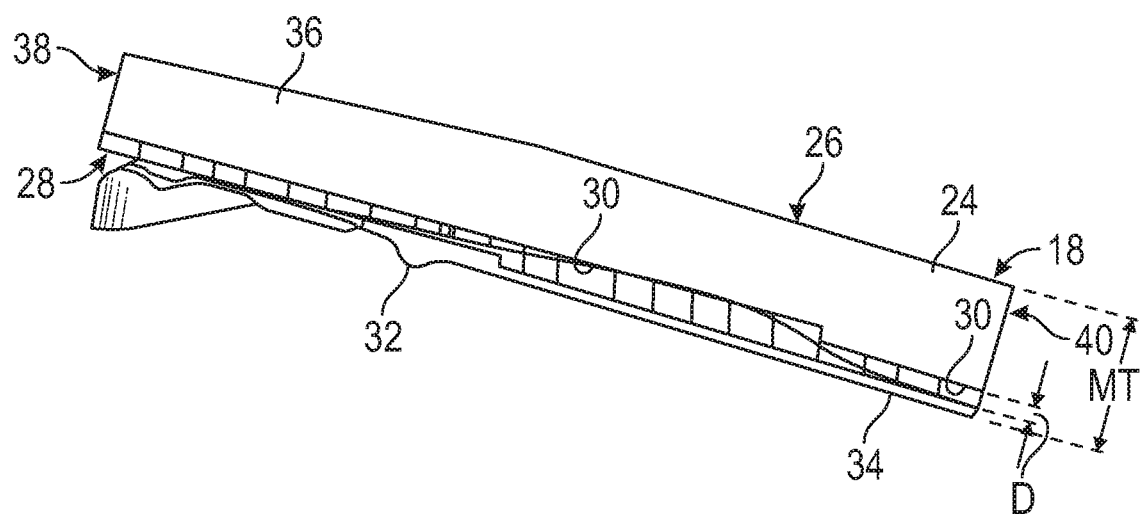
FIG. 2 is a schematic side view of the vehicle seat of FIG. 1, including a seat cushion and a seat pan.

With reference to FIG. 2, the seat cushion 18 includes a cushion body 24 defining a first body surface 26 (i.e., the A-surface) and a second body surface 28 (i.e., the B-surface) opposite the first body surface 26. The first body surface 26 is configured to face the seat occupant SO, and the second body surface 28 is configured to face away from the seat occupant SO. The cushion body 24 may be wholly or partly made of a foam, such as a polyurethane foam. The cushion body 24 may be made using a single-shot manufacturing process. Due to the holes 30, the mass of the seat cushion 18 is minimized.

Figure 3:
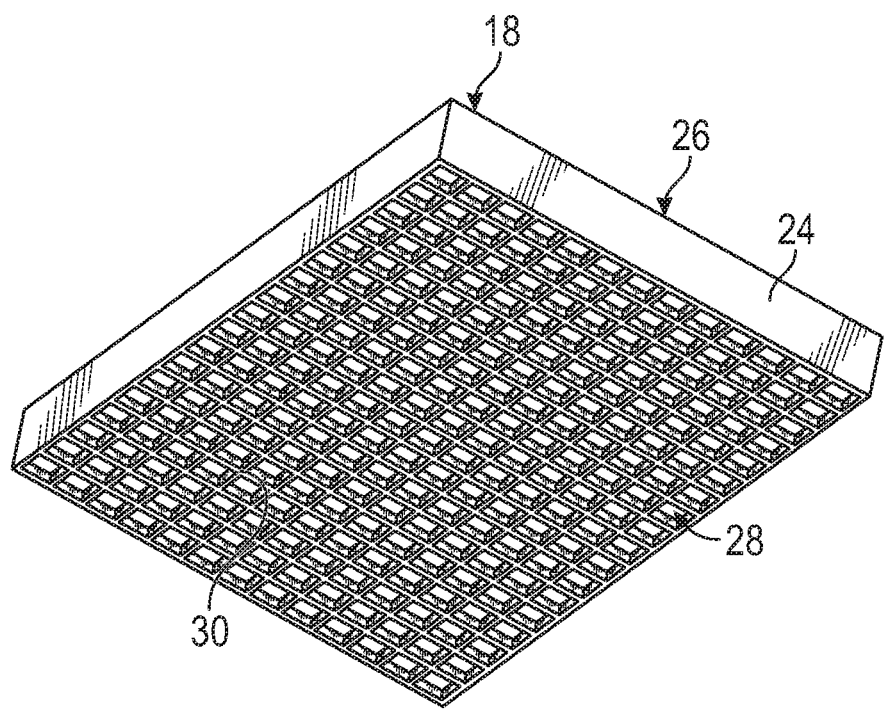
FIG. 3 is a schematic perspective bottom view of the seat cushion of the vehicle seat shown in FIG. 1.

With reference to FIGS. 2 and 3, the cushion body 24 defines a plurality of holes 30 extending into the second body surface 28. The holes 30 are arranged on a waffle-board pattern to allow the cushion body 24 to passively conform to the seat occupant SO, thereby enhancing comfort. The cushion body 24 may be supported by a seat pan 32 and a suspension 34. The suspension 34 may be, for example, an elongated elastic band or other suitable structure capable of suspending the cushion body 24. The cushion body 24 defines a maximum thickness MT from the first body surface 26 to the second body surface 28. Each of the holes 30 has a depth D. The holes 30 may have different depths D. However, it is envisioned that each of the holes 30 may have the same depth D. In some embodiments, the depth D of each of the holes 30 is fifteen percent of the maximum thickness MT to enhance a seating comfort of the seat cushion 18. In other embodiments, the depth D of each of the holes 30 is twenty-five percent of the maximum thickness T to enhance a seating comfort of the seat cushion 18. In the depicted embodiment, each of the holes 30 has a square shape.

With continued reference to FIGS. 2 and 3, the cushion body 24 includes a front region 36 that is tapered to control pressure distribution under knees of the seat occupant SO (FIG. 1). The cushion body 24 includes a frontal surface 38 and a rear surface 40 opposite the frontal surface 38. Due to its tapered configuration, the thickness of the front region 36 of the cushion body 24 decreases in a direction toward the frontal surface 38.

Figure 4:
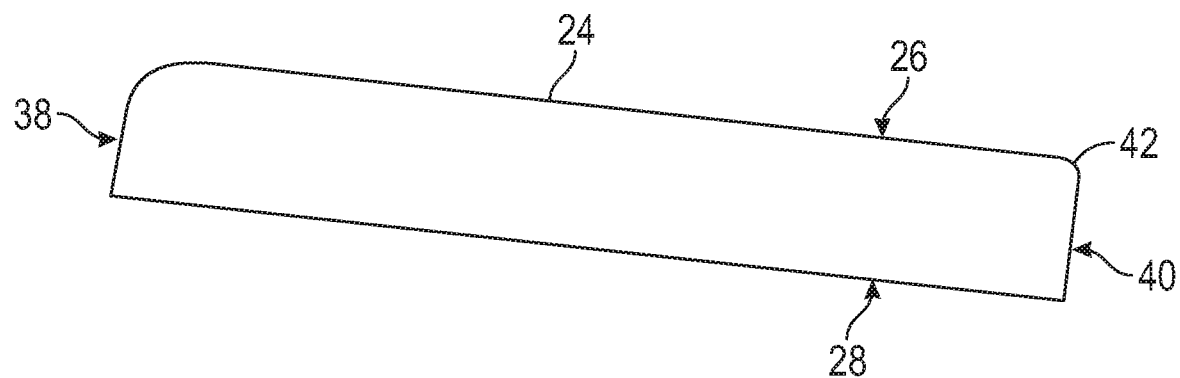
FIG. 4 is a schematic side view of a seat cushion of a vehicle seat, depicting a fillet.

With reference to FIG. 4, the cushion body 24 includes a fillet 42 (or taper) to control pressure distribution under the coccyx of the seat occupant SO. The fillet 42 interconnects the first body surface 26 and the rear surface 40 of the cushion body 24.

Figure 5:
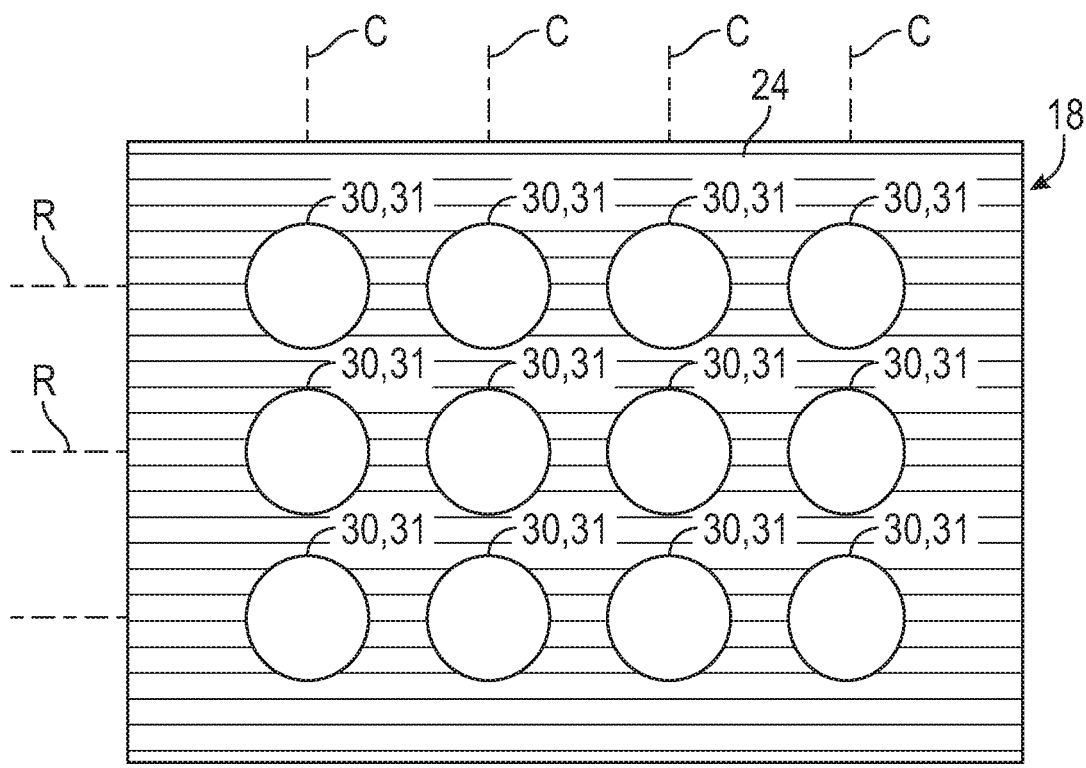
FIG. 5 is a schematic bottom view of the seat cushion, depicting circular holes aligned in rows and columns.
Figure 6:
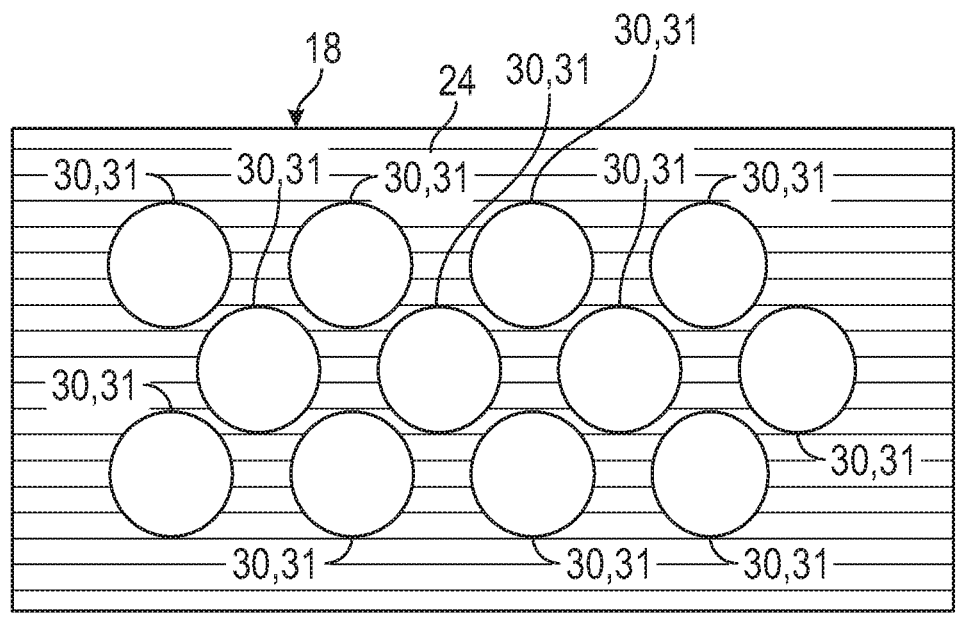
FIG. 6 is a schematic bottom view of the seat cushion, depicting circular holes that are offset relative to each other.
Figure 7:
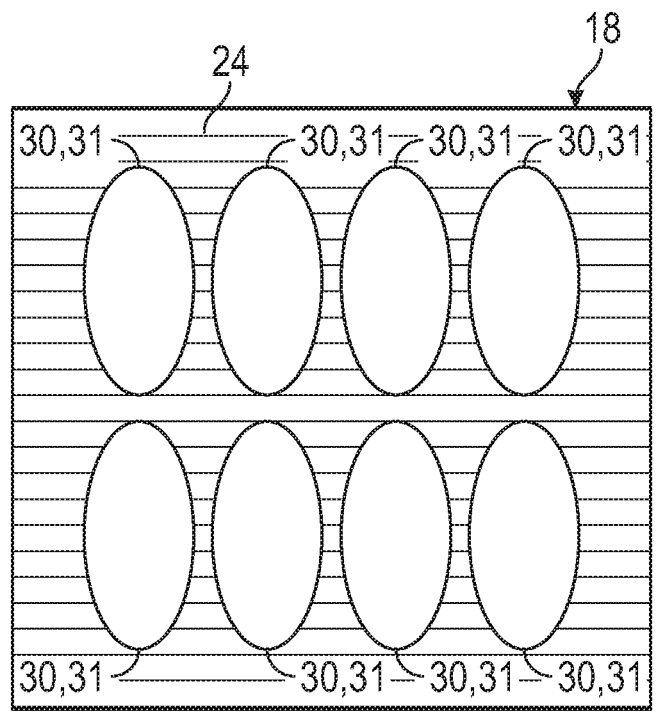
FIG. 7 is a schematic bottom view of the seat cushion, depicting holes having an elliptical shape.
Figure 8:
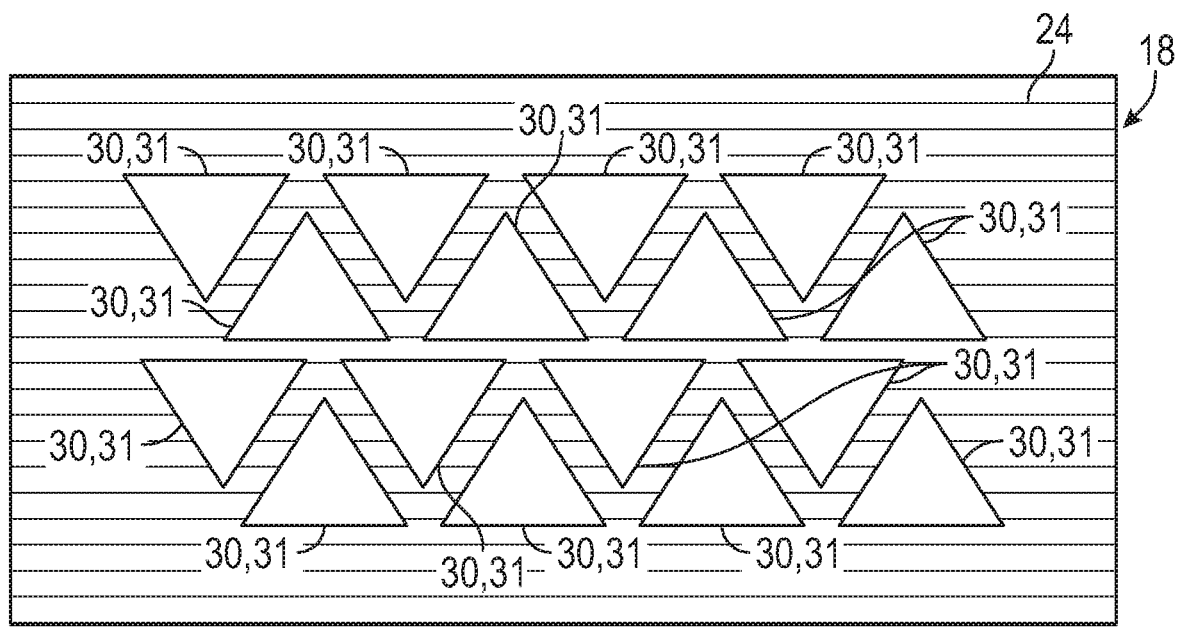
FIG. 8 is a schematic bottom view of the seat cushion, depicting holes having a triangular shape.
Figure 9:
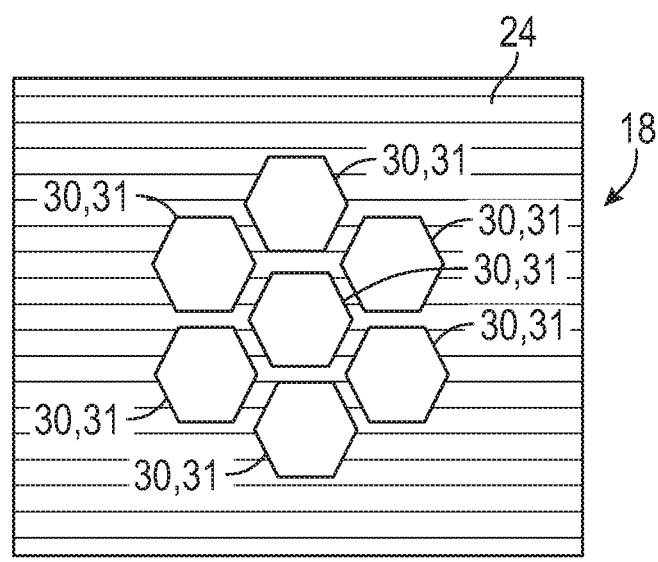
FIG. 9 is a schematic bottom view of the seat cushion, depicting holes having a hexagonal shape.
Figure 10:
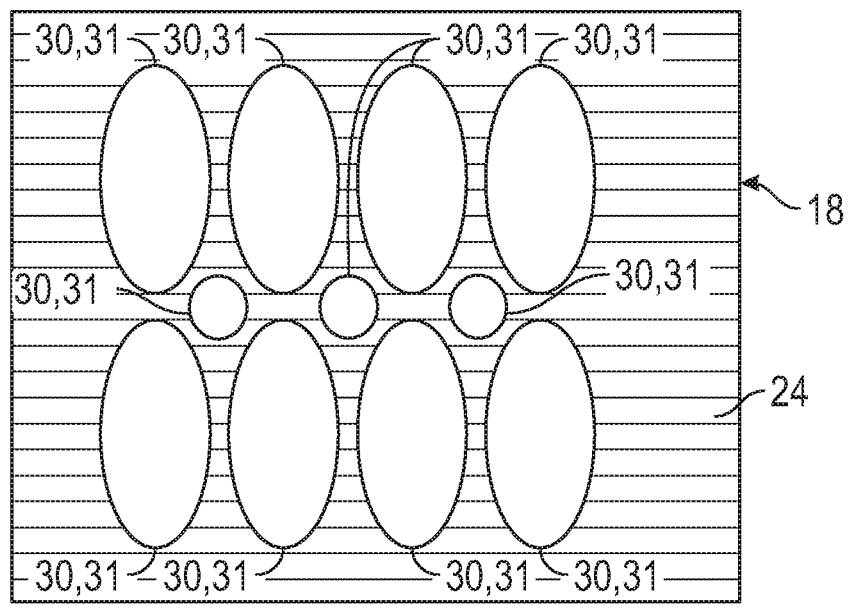
FIG. 10 is a schematic bottom view of the seat cushion, depicting holes having an elliptical shape and a circular shape.

With reference to FIG. 5, each of the holes 30 of the cushion body 24 may have a circular shape. As shown in FIG. 5, the holes 30 are aligned with each other along linear rows R (represented by row axes R) and linear columns C (represented by column axes C). However, as shown in FIG. 6, holes 30 (which may be circular) may not be aligned along linear columns. Rather, at least some of the holes 30 may be offset relative to each other. As shown in FIG. 7, each of the holes 30 may have an elliptical shape. As shown in FIG. 8, each of the holes 30 may have a triangular shape. As shown in FIG. 9, each of the holes 30 may have a hexagonal shape such that the seat cushion 24 is configured as a honeycomb structure. As shown in FIG. 10, the holes 30 may have different shapes. For instance, as shown in FIG. 10, some holes 30 (e.g., eight holes 30) have elliptical shapes, and other holes 30 (e.g., three holes 30) have circular shapes. In the embodiment depicted in FIG. 10, a row of holes 30 having a circular shape is disposed between two rows of the holes 30 having an elliptical shape.

Figure 11:
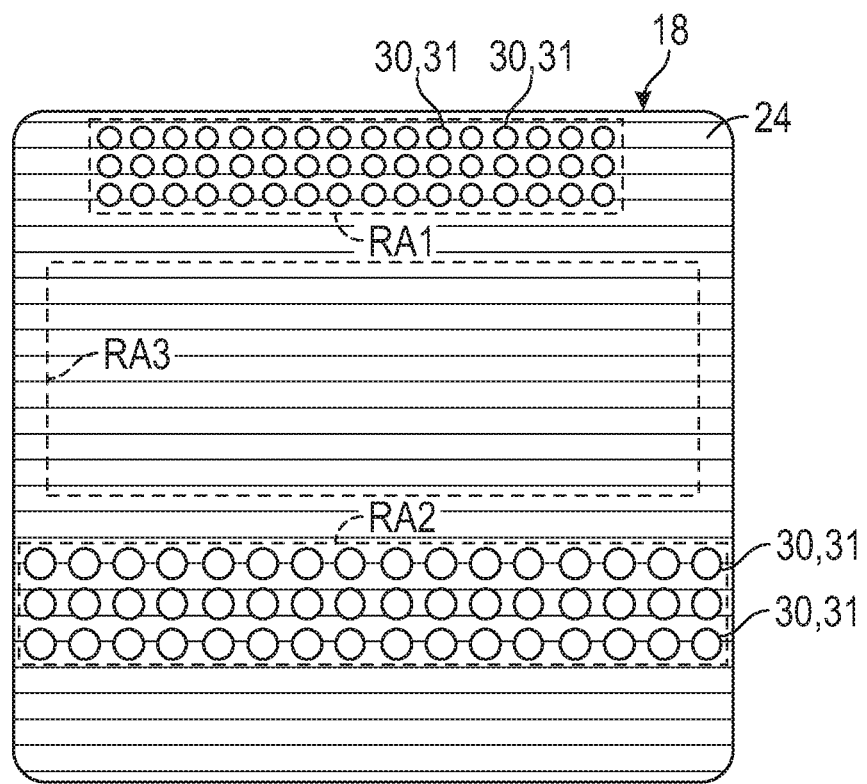
FIG. 11 is a schematic bottom view of the seat cushion, depicting holes having different sizes.

With reference to FIG. 11, seat cushion 18 may define holes 30 having different spatial gradation. The hole size, hole shape, hole orientation, and/or hole depth may be different in different regions of the seat cushion 18. For instance, in the depicted embodiment, the seat cushion 18 includes two regions RA1 and RA2 that are spaced apart from each other. The holes 30 is the regions RA1 and RA2 have different sizes and spacing. In the region RA2, the holes 30 are circular but are larger than the holes 30 in the other region RA1. Another region RA3 does not have holes 30.

Figure 12:
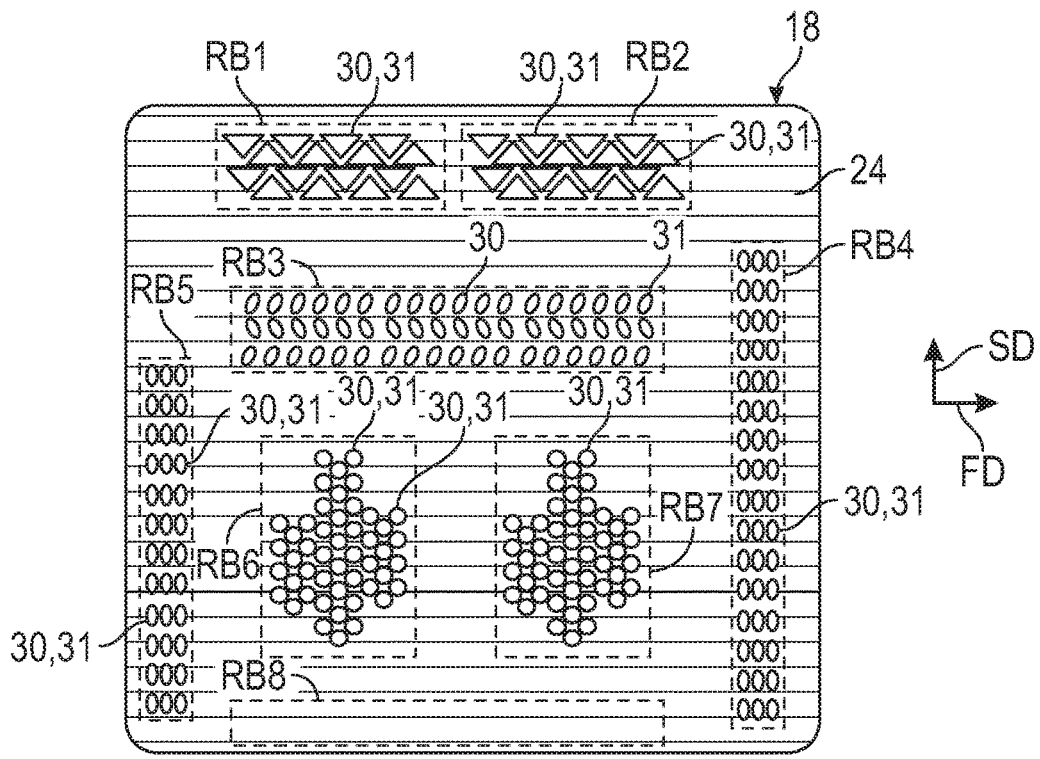
FIG. 12 is a schematic bottom view of the seat cushion, depicting holes having different shapes.

With reference to FIG. 12, the seat cushion 18 may define different hole shape, hole size, hole depth, hole orientation, and hole spacing in different parts of the cushion body 24. For example, in the depicted embodiment, the seat cushion 18 defines holes 30 having a triangular shape in a first region RB1 and a second region RB2 of the cushion body 24. The first region RB1 and the second region RB2 are spaced apart from each other along a first direction FD. The holes 30 in a third region RB3 have an elliptical shape and may be obliquely angled relative to each other. The third region RB3 is spaced apart from the first region RB1 and the second region RB2 along a second direction SD. The second direction SD is perpendicular to the first direction FD. The holes 30 in a fourth region RB4 may have an elliptical shape. The fourth region RB3 is elongated along the first direction RB4. The holes 30 have an elliptical shape. The fifth region RB5 is elongated along the second direction SD. The fifth region RB5 is spaced apart from the fourth region RB4 along the first direction FD. The holes 30 in the sixth region RB6 and the seventh region RB7 of the cushion body 24 have a circular shape and are configured to receive the sit bones SB (FIG. 1) of the seat occupant SO. The spacing and arrangement of the holes 30 in the sixth region RB6 and the seventh region RB7 are configured to receive the sit bones SB (FIG. 1) of the seat occupant SO. At least one of the regions (i.e., eight region RB8) does not have holes 30.

Figure 13:
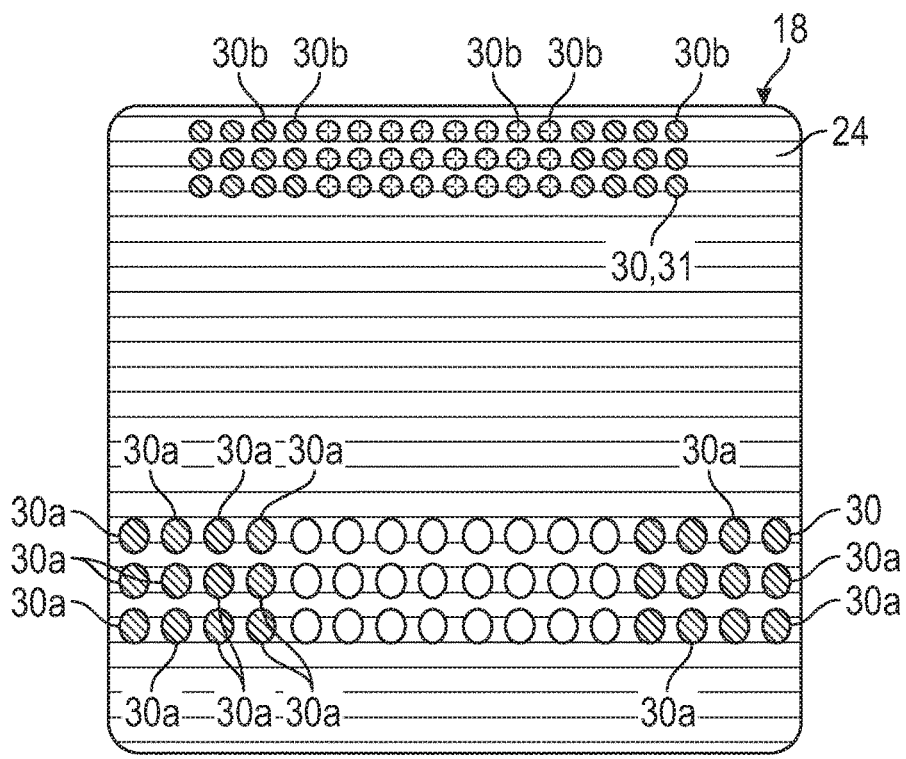
FIG. 13 is a schematic bottom view of the seat cushion, depicting holes that are partially and/or completely filled with a material.

With reference to FIG. 13, the cushion body 24 is wholly or partly made of a cushion material (i.e., first material) having a first elastic modulus. At least some (e.g, most) of the holes 30 are partially or completely filled with a fill material (i.e., the second material) having a second elastic modulus. The second elastic modulus is less than the first elastic modulus to enhance the seating comfort of the seat cushion 18. In the depicted embodiment, some of the holes 30 (i.e., holes 30a) are partially filled with the fill material, and other holes 30 (i.e., 30b) are completely filled with the fill material.

Figure 14:
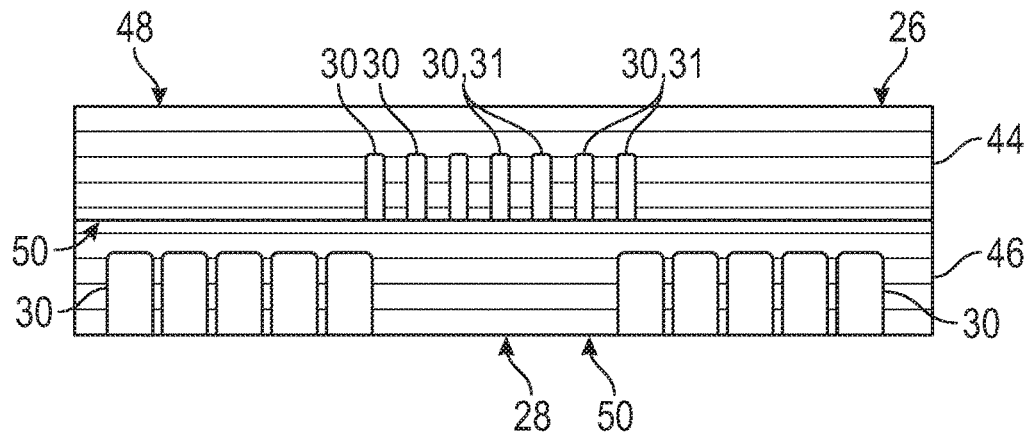
FIG. 14 is a schematic side view of the seat cushion, depicting stacked layers.

With reference to FIG. 14, the cushion body 24 includes a plurality of stacked layers (e.g., the first layer 44 and the second layer 46). In the depicted embodiment, the first layer 44 defines the first body surface 26, and the second layer 46 defines the second body layer 28. The stacked layers (e.g., the first layer 44 and the second layer 46) may be glued to each other and each may have a different hole pattern. In the depicted embodiment, each of the plurality of stacked layers (e.g., the first layer 44 and the second layer 46) defines a first layer surface 48 and a second layer surface 50 opposite the first layer surface 48. The first layer surface 48 is configured to face the seat occupant SO seated on the seat cushion 18. The second layer surface 50 is configured to face away from the seat occupant SO seated on the seat cushion 18. The first layer surface 48 of the first layer 44 is coextensive with the first body surface 26, and the second layer surface 50 of the second layer 46 is coextensive with the second body surface 28. The holes 30 extend into (not entirely through) each of the second layer surface 50 of the first layer 44 and the second layer 46. In other words, each of the first layer 44 and the second layer 46 defines holes 30 extending into its respective second layer surface 50. As a result, at least one of the holes 30 is entirely disposed between the first body surface 26 and the second layer surface 28. The holes 30 may have a substantially rectangular shape. The holes 30 in the first layer 44 have a different size than the holes 30 in the second layer 46.

Figure 15:
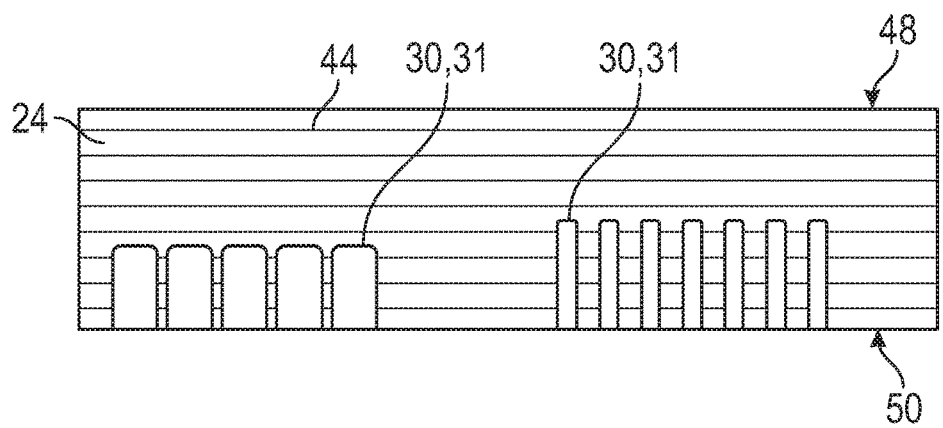
FIG. 15 is a schematic side view of the seat cushion, depicting a layer defining holes in its bottom surface.

With reference to FIG. 15, at least one of the stacked layers (e.g., the first layer 44 and/or the second layer 46) of the cushion body 24 defines holes 30 extending into the second layer surface 50. In this embodiment, no hole 30 extends into the first layer surface 48.

Figure 16:
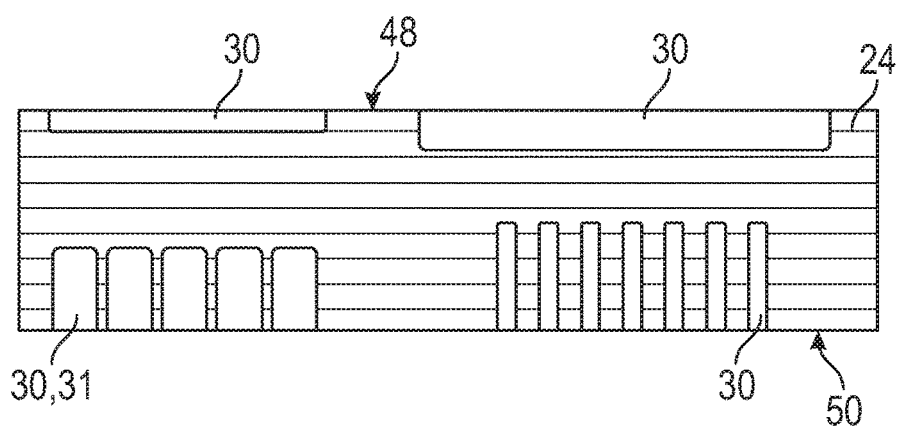
FIG. 16 is a schematic side view of the seat cushion, depicting a layer defining holes in its upper and bottom surfaces.

With reference to FIG. 16, at least one of the stacked layers (e.g., the first layer 44 and/or the second layer 46) of the cushion body 24 defines holes 30. Some of the holes 30 extend into the first layer surface 48. Other holes 30 extend into the second layer surface 50. The holes 30 may have different shapes and sizes.

Figure 17:
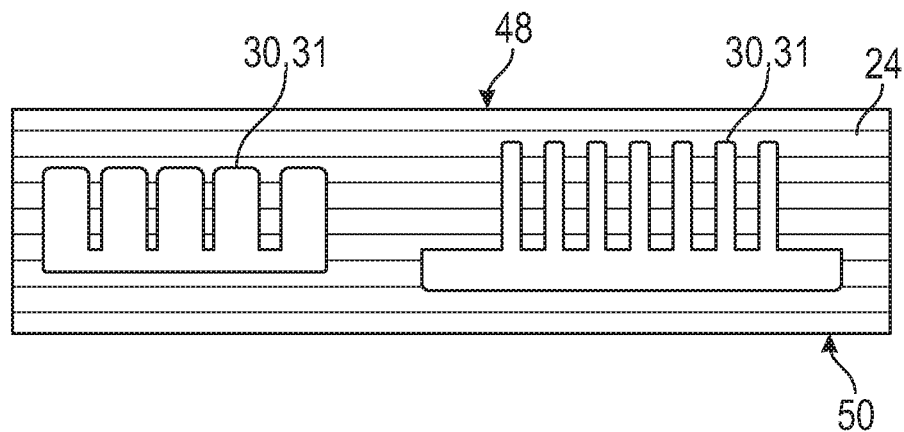
FIG. 17 is a schematic side view of the seat cushion, depicting a layer defining holes between its upper and bottom surfaces.

With reference to FIG. 17, one or more holes 30 are defined between the first layer surface 48 and the second layer surface 50. In the depicted embodiment, each of the holes 30 is entirely disposed between the first layer surface 48 and the second layer surface 50.

Figure 18:
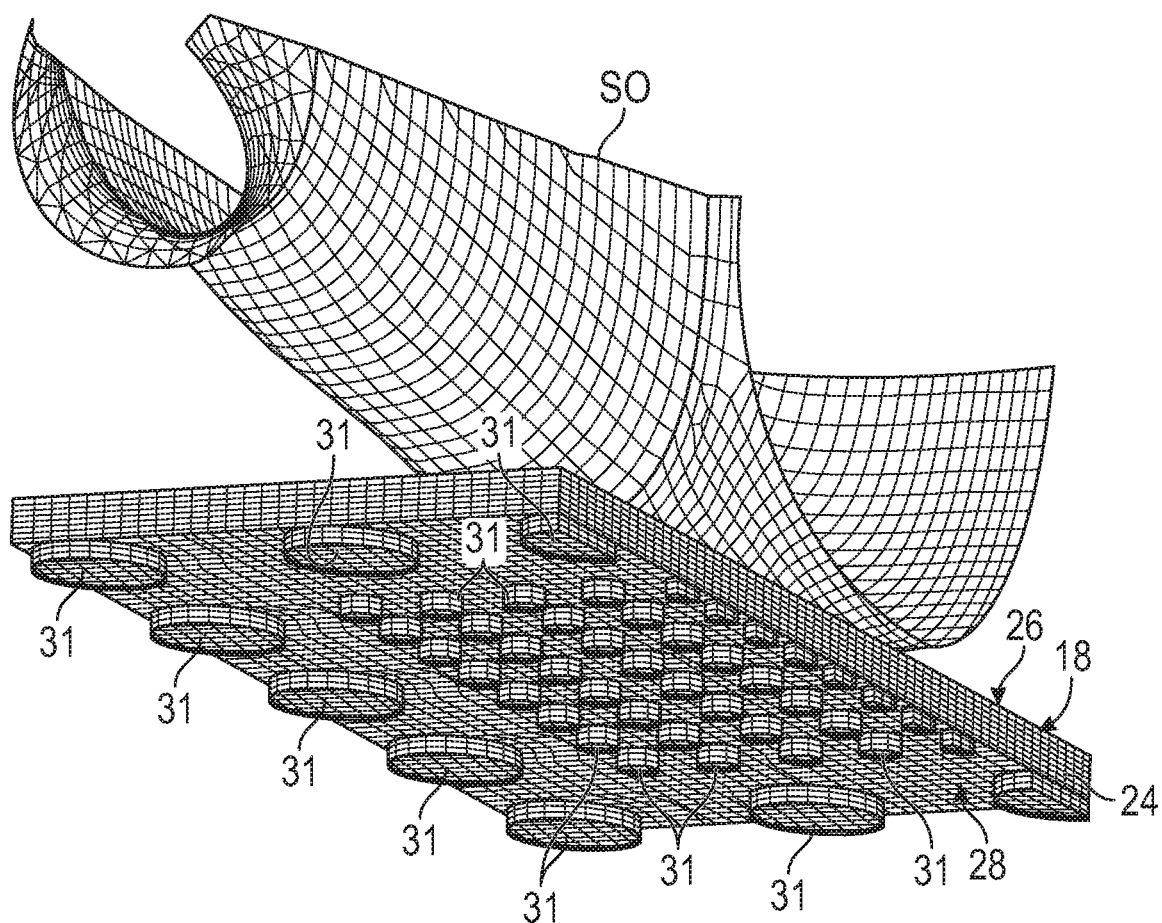
FIG. 18 is a schematic perspective view of a vehicle seat, wherein the vehicle seat includes a plurality of columns.

With reference to FIG. 18, the seat cushion 18 may include a plurality of columns 31 extending from the second body surface 28. The columns 31 may have different sizes. The columns 31 are arranged in a pattern to allow the cushion body 24 to passively conform to the seat occupant SO, thereby enhancing comfort. In the depicted embodiment, each of the columns 31 protrude directly from the second body surface 28 of the cushion body 24 in a direction away from the first body surface 26.

Figure 19:
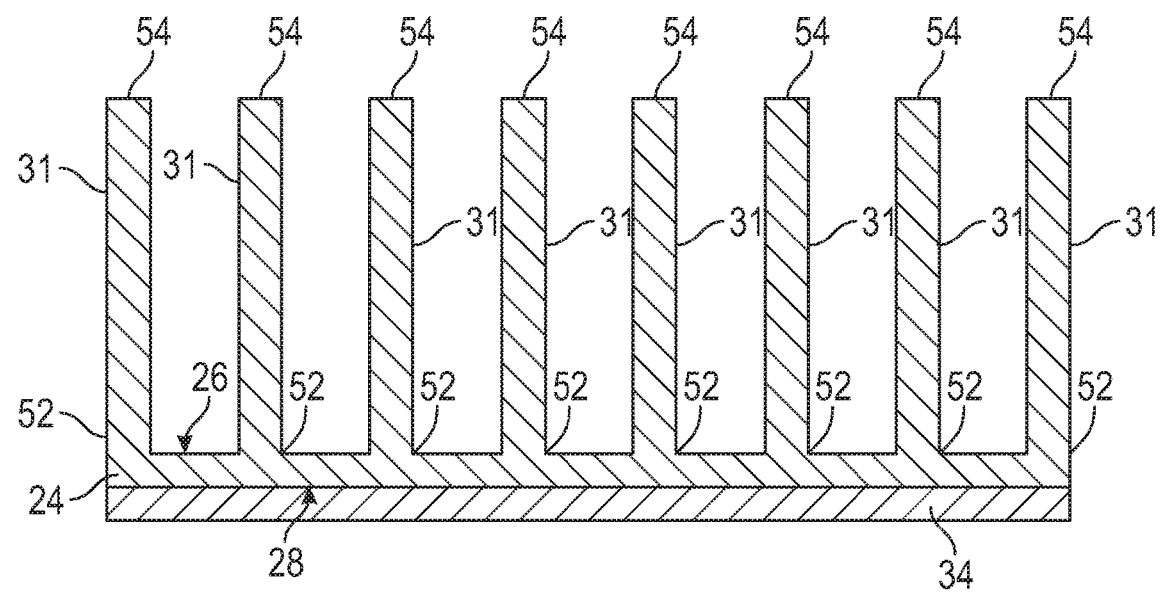
FIG. 19 is a schematic side view of the vehicle seat, wherein the columns are arranged as a compliant bed of nails.

With reference to FIG. 19, the seat cushion 18 is configured as a basic bed of nails. In this embodiment, the cushion body 24 directly interconnects the columns 31 together. In this embodiment, the columns 31 protrude from the first body surface 26 of the cushion body in a direction away from the second body surface 28. The columns 31 are connected to the cushion body 24 solely through the cushion body 24. Each of the columns 31 has a first column end 52 and a second column end 54 opposite the first column end 54. The first column end 52 is directly coupled to the cushion body 24 to enhance the structural integrity of the seat cushion 18. However, in this embodiment, the second column end 54 is coupled to the cushion body 24 solely through the first column end 52.

Figure 20:
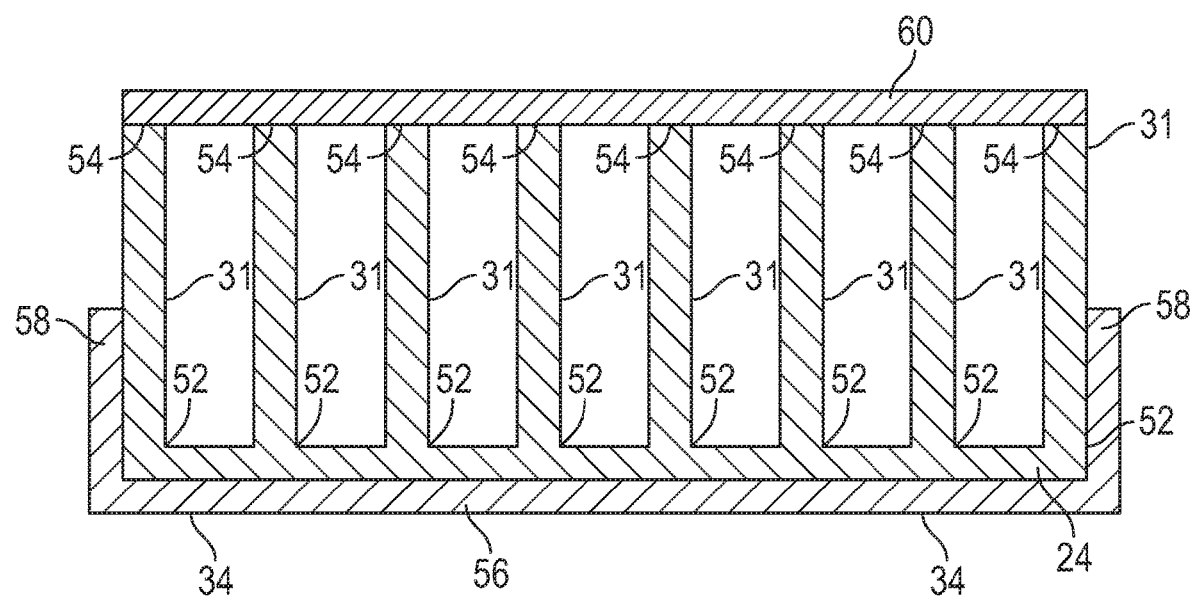
FIG. 20 is a schematic side view of the vehicle seat of FIG. 18, wherein the columns are arranged as a closed compliant bed of nails.

With reference to FIG. 20, the seat cushion 18 is configured as the closed basic bed of nails. In this embodiment, the suspension 34 includes a suspension base 56 with a pair of side restraints 58 to minimize shear. The seat cushion 18 includes a cushion cover 60 directly coupled to the second column end 54 of each column 31 to minimize shear.

Figure 21:
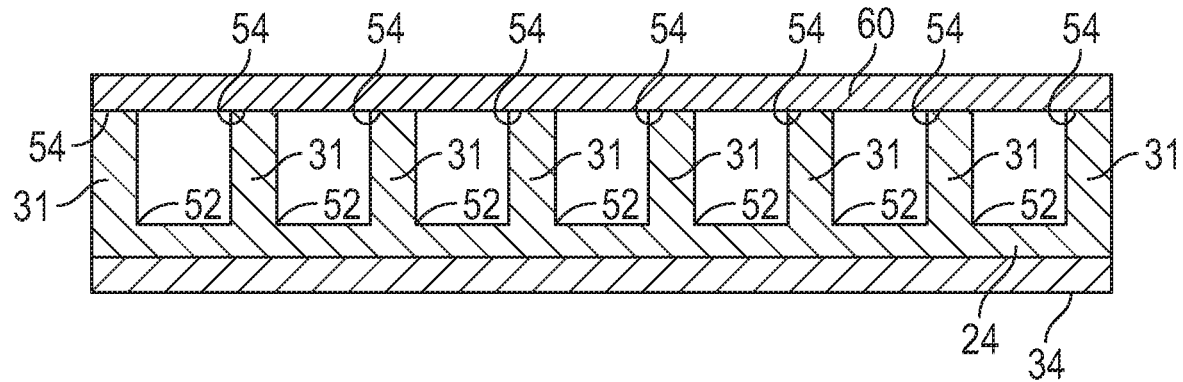
FIG. 21 is a schematic side view of the vehicle seat of FIG. 18, wherein the columns are arranged as a closed compliant bed with stubby columns.

With reference to FIG. 21, the seat cushion 18 is configured as the closed basic bed of nails with stubby columns 31. In this embodiment, the cushion cover 60 of the seat cushion 18 is directly coupled to the second column end 54 of each column 31 to minimize shear. Further, the columns 31 have a stubby configuration. The columns 31 may have a circular shape (FIG. 5, FIG. 6, and FIG. 18), an elliptical shape (FIG. 7 and FIG. 10), a triangular shape (FIG. 8), a hexagonal shape (with a honeycomb structure as shown in FIG. 9), and/or a square shape.

Figure 22:
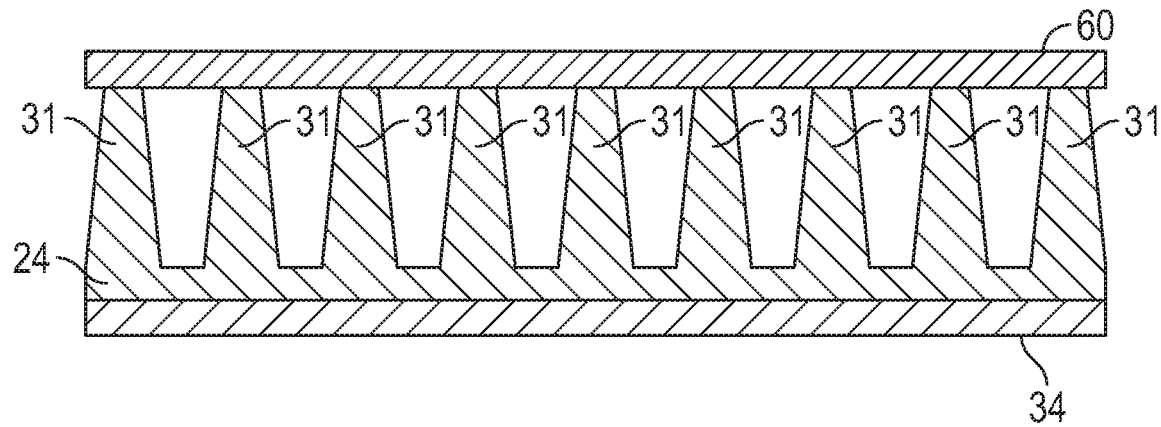
FIG. 22 is a schematic side view of the vehicle seat of FIG. 18, wherein the columns are tapered.

With reference to FIG. 22, the columns 31 have a tapered configuration to provide progressive stiffness. In particular, the width of each column 31 decrease in a direction from the cushion body 24 toward the cushion cover 60.

Figure 23:
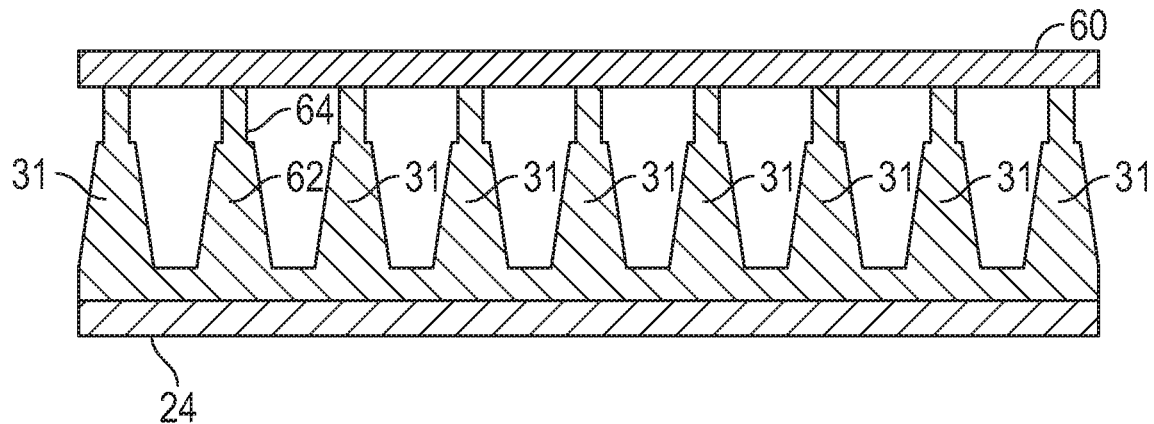
FIG. 23 is a schematic side view of the vehicle seat of FIG. 18, wherein the columns have two layers.

With reference to FIG. 23, the columns 31 have two layers (i.e., a first column layer 62 and a second column layer 64). The second column layer 64 is directly connected to the first column layer 62 to enhance the structural integrity of the column 31. The first column layer 62 is tapered. As such, the width of each first column layer 62 decrease in a direction from the cushion body 24 toward the cushion cover 60. The second column layer 64 has a uniform cross-sectional dimension.

Figure 24:
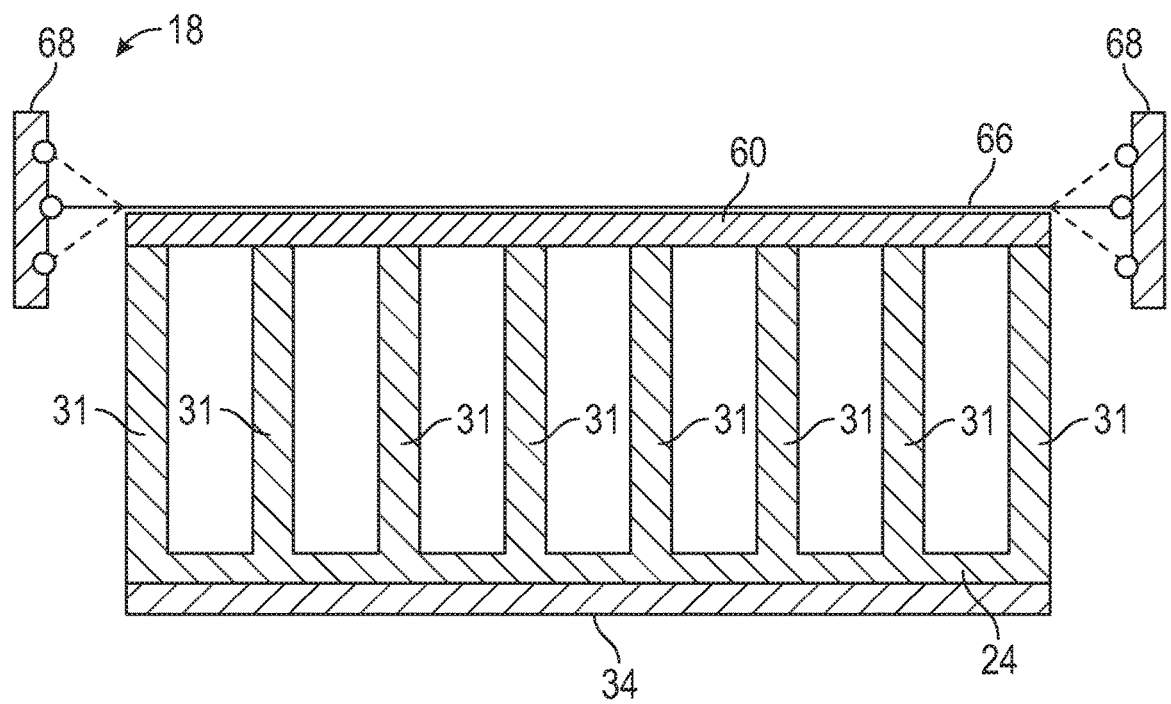
FIG. 24 is a schematic side view of the vehicle seat of FIG. 18, including a stretched trim.

With reference to FIG. 24, the seat cushion 18 is configured as the closed basic bed of nails as described above with respect to FIG. 20. In addition, the vehicle seat 18 includes a stretched trim 66 to maintain the cushion cover 60 coupled to the columns 31. The stretched trim 66 is coupled to two stationary structures 68.

Figure 25:
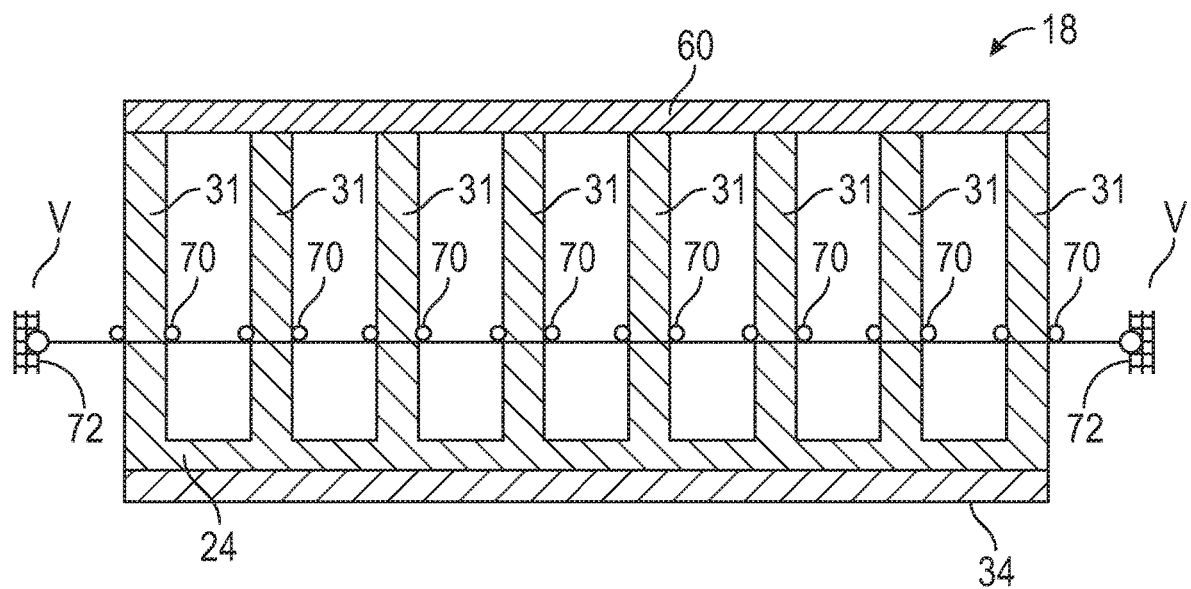
FIG. 25 is a schematic side view of the vehicle seat of FIG. 18, including movable restraints.

With reference to FIG. 25, the seat cushion 18 includes movable restraints 70 coupled to at least two of columns 31 to minimize shear. The movable restraints 70 are coupled to one or more moving mechanisms 72 to allow the movable restrains to move in a vertical direction V. Consequently, the movable restraints 70 are movable relative to the columns 31 to tune a stiffness of the seat cushion 18.

Figure 26:
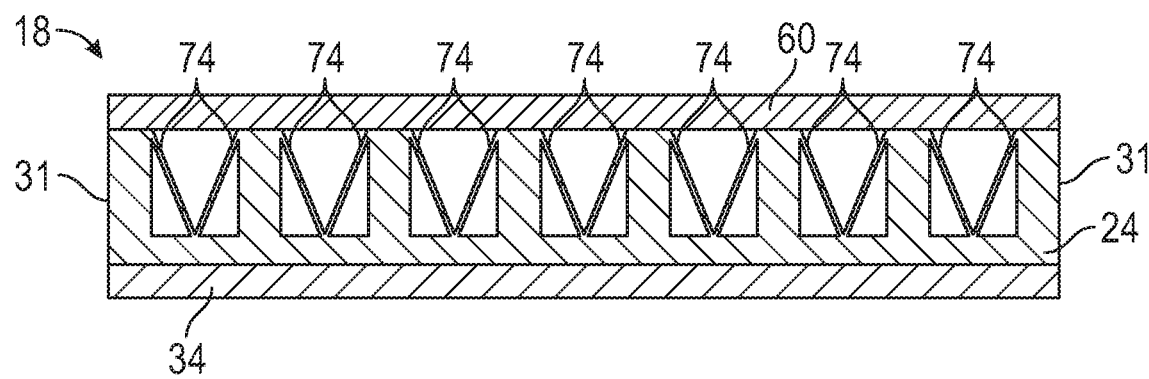
FIG. 26 is a schematic side view of the vehicle seat of FIG. 18, including columns arranged in a tent configuration.

With reference to FIG. 26, in addition to the columns 31, the seat cushion 18 includes angled struts 74 coupled between the cushion cover 60 and the cushion body 24 to restrain shear. Each angled strut 74 is obliquely angled relative to each column 31.

Figure 27:
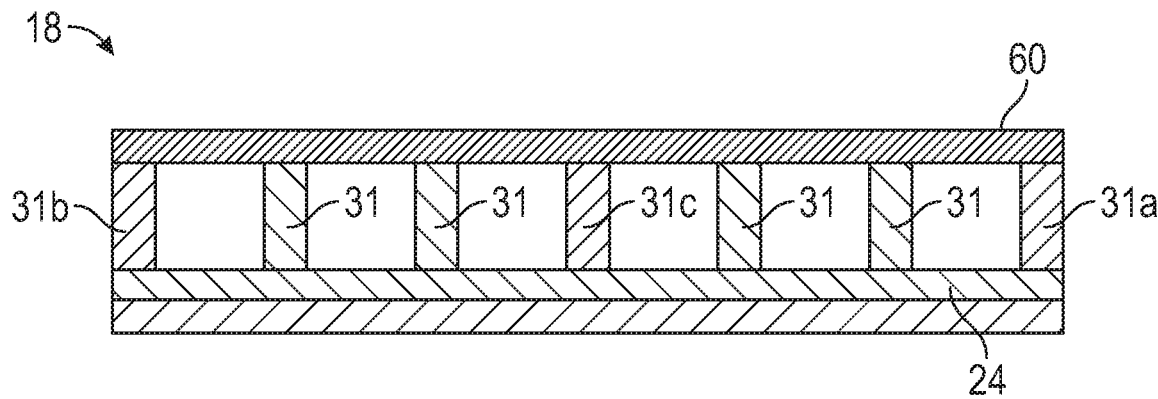
FIG. 27 is a schematic side view of the vehicle seat of FIG. 18, including columns with higher modulus columns.

With reference to FIG. 27, the columns 31 includes a first lateralmost column 31a, a second lateralmost column 31b, and a center column 31c. Each of the first lateralmost column 31a, the second lateralmost column 31b, and the center column 31c are wholly or partially made of a first material, and the remaining of the columns 31 are wholly or partially made a second material. The first material has a first elastic modulus, the second material has a second elastic modulus, and the second elastic modulus is less than the first elastic modulus to provide a double arch support.

Figure 28:
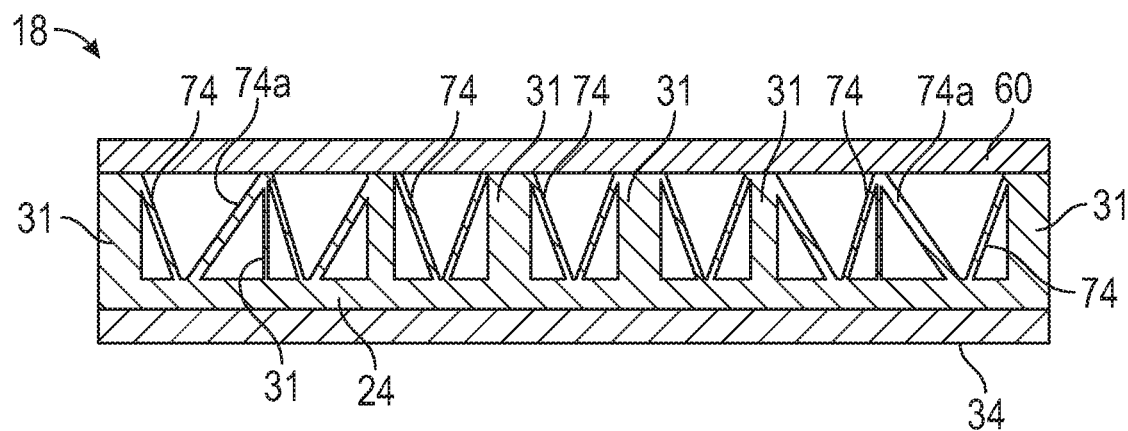
FIG. 28 is a schematic side view of the vehicle seat of FIG. 18, including stiffer angled struts.

With reference to FIG. 28, in addition to the columns 31, the seat cushion 18 includes angled struts 74 coupled between the cushion cover 60 and the cushion body 24 to restrain shear. Each angle strut 74 is obliquely angled relative to each column 31. At least two of the angled struts 74a (at the sides of the seat cushion 18) are stiffer than the remaining of the angled struts 74 to provide lateral support. Alternatively or additionally, the seat cushion 18 may include more angled struts 74 than the embodiment shown in FIG. 26.

Figure 29:
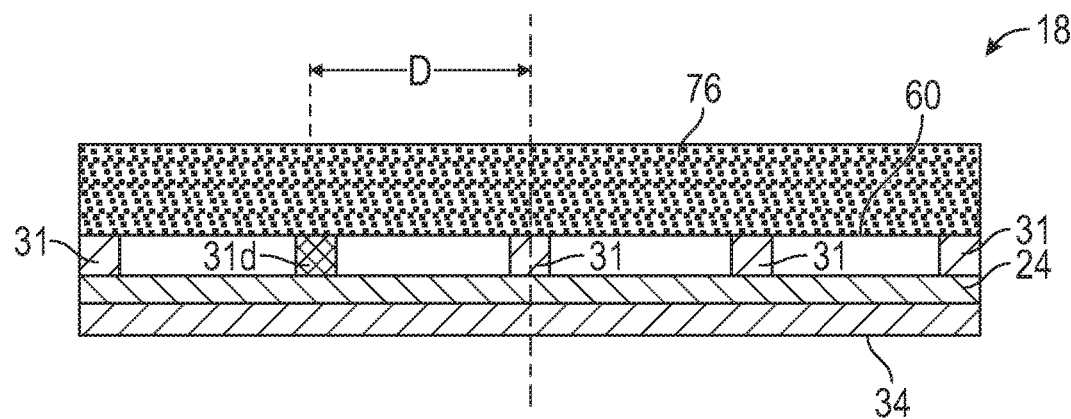
FIG. 29 is a schematic side view of the vehicle seat of FIG. 18, including at least one less dense column.

With reference to FIG. 29, the seat cushion 18 includes at least one column 31d that is less stiff than the remaining columns 31. The less stiff column 31 is offset from the center of the seat cushion 18 by a predetermined distance D.

Figure 30:
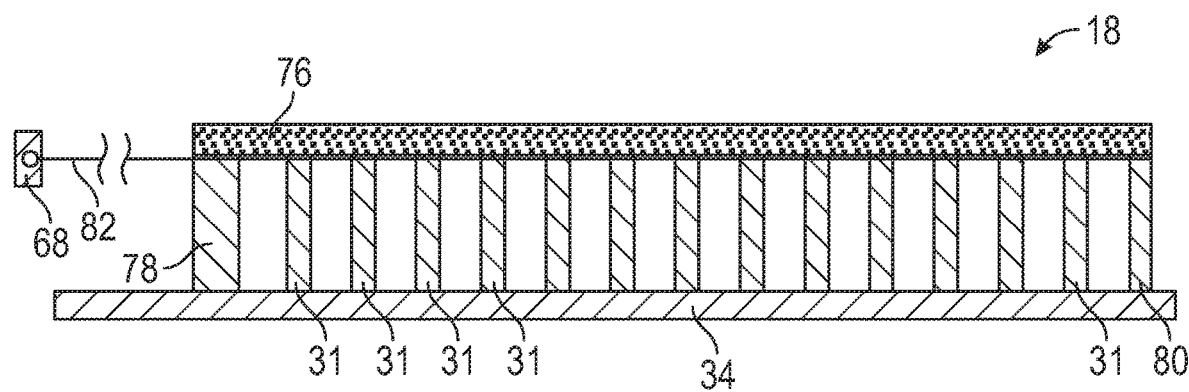
FIG. 30 is a schematic side view of the vehicle seat of FIG. 18, including outboard symmetry guide and an inboard symmetry guide.

With reference to FIG. 30, the seat cushion 18 may further include an outboard symmetry guide 78 and an inboard symmetry guide 80. The seat cushion 18 includes an upper foam 76 and a trim membrane coupler 82 connecting the upper foam 76 to the columns 31. The trim membrane coupler 82 may be stretched and connected to the stationary structure 68. The cushion body 24 may be made using a single-shot manufacturing process. Due to the holes 30, the mass of the seat cushion 18 is minimized. While the depicted embodiments show columns having cylindrical and conical shapes, it is envisioned that the columns 31 may have other shapes (e.g., various prisms and/or mixtures of geometries). The spatial gradation of the columns may vary as shown in FIGS. 11 and 12. The space between the columns 31 may be left void or may be filled with a second material having a lower elastic modulus as shown in FIG. 13. The cushion body 24 may include stacked layers (e.g., the first layer 44 and the second layer 46) that may be glued together as shown in FIGS. 14-17. The columns 31 in the stacked layers may have different patterns. The columns 31 may be on the first body surface 26, second body surface 28, and/or on an intermediate layer in the stacked cushion as shown in FIG. 17.

While the best modes for carrying out the teachings have been described in detail, those familiar with the art to which this disclosure relates will recognize various alternative designs and embodiments for practicing the teachings within the scope of the appended claims. The seat cushion 18 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A seat cushion, comprising:
 a cushion body defining a first body surface and a second body surface opposite the first body surface, wherein the first body surface is configured to face a seat occupant, and the second body surface is configured to face away from the seat occupant;
 wherein the cushion body defines a plurality of holes extending into the second body surface, wherein the plurality of holes is arranged in a pattern to allow the cushion body to passively conform to the seat occupant, thereby enhancing comfort;
 wherein the holes are arranged on a waffle-board pattern; and
 wherein the cushion body defines a maximum thickness from the first body surface to the second body surface, and each of the plurality of holes has a depth, and the depth is twenty-five percent of the maximum thickness to enhance a seating comfort of the seat cushion.

2. The seat cushion of claim 1, wherein the cushion body includes a front region, and the front region of the cushion body is tapered to control pressure distribution under knees of the seat occupant.

3. The seat cushion of claim 1, wherein the cushion body includes a frontal surface and a rear surface opposites the frontal surface, the cushion body includes a front region, the front region includes the frontal surface, the front region of the cushion body is tapered such that a thickness of the front region of the cushion body decreases in a direction toward the frontal surface.

4. A seat cushion, comprising:
 a cushion body defining a first body surface and a second body surface opposite the first body surface, wherein the first body surface is configured to face a seat occupant, the second body surface is configured to face away from the seat occupant, and the cushion body defines a maximum thickness from the first body surface to the second body surface;
 wherein the cushion body defines a plurality of holes extending into the second body surface, each of the plurality of holes has a depth, and the depth is fifteen percent of the maximum thickness to enhance seating comfort of the seat cushion; and
 wherein the holes are arranged on a waffle-board pattern.

5. The seat cushion of claim 4, wherein the cushion body is wholly made of a polyurethane foam.

6. The seat cushion of claim 4, further comprising a seat pan, wherein the cushion body is supported by the seat pan.

7. A seat cushion, comprising:
 a cushion body defining a first body surface and a second body surface opposite the first body surface, wherein the first body surface is configured to face a seat occupant, the second body surface is configured to face away from the seat occupant, and the cushion body defines a maximum thickness from the first body surface to the second body surface;
 a suspension, wherein the cushion body is supported by the suspension, and the suspension is an elastic band configured to suspend the cushion body; and
 wherein the cushion body defines a plurality of holes extending into the second body surface, each of the plurality of holes has a depth, and the depth is fifteen percent of the maximum thickness to enhance seating comfort of the seat cushion.

8. The seat cushion of claim 7, wherein each of the holes has a square shape.

9. The seat cushion of claim 8, wherein the cushion body includes a front region, and the front region of the cushion body is tapered to control pressure distribution under knees of the seat occupant.

\* \* \* \* \*